United States Patent
Toyoshima et al.

(10) Patent No.: US 12,063,462 B2
(45) Date of Patent: Aug. 13, 2024

(54) OPTICAL BUFFER UNIT, OPTICAL SIGNAL PROCESSING APPARATUS, OPTICAL LABEL SWITCH AND CONTROL METHOD

(71) Applicant: NIPPON TELEGRAPH AND TELEPHONE CORPORATION, Tokyo (JP)

(72) Inventors: Yukio Toyoshima, Musashino (JP); Keita Nishimoto, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 29 days.

(21) Appl. No.: 17/908,102

(22) PCT Filed: Jun. 10, 2020

(86) PCT No.: PCT/JP2020/022849
§ 371 (c)(1),
(2) Date: Aug. 30, 2022

(87) PCT Pub. No.: WO2021/176743
PCT Pub. Date: Sep. 10, 2021

(65) Prior Publication Data
US 2023/0095348 A1    Mar. 30, 2023

(30) Foreign Application Priority Data
Mar. 4, 2020   (WO) .................. PCT/JP2020/009225

(51) Int. Cl.
*H04Q 11/00*    (2006.01)

(52) U.S. Cl.
CPC ................ *H04Q 11/0005* (2013.01); *H04Q 2011/002* (2013.01)

(58) Field of Classification Search
CPC ...................... H04Q 11/0005; H04Q 2011/002
USPC ........................................................... 398/48
See application file for complete search history.

(56) References Cited

U.S. PATENT DOCUMENTS

| | | | | |
|---|---|---|---|---|
| 5,859,939 A | * | 1/1999 | Fee | H04B 10/2569 385/24 |
| 5,943,636 A | * | 8/1999 | Baldwin | H04B 10/07 702/119 |
| 6,545,781 B1 | | 4/2003 | Chang et al. | |
| 2009/0252493 A1 | * | 10/2009 | Xu | H04J 14/0256 398/53 |
| 2012/0293856 A1 | | 11/2012 | Onaka | |

FOREIGN PATENT DOCUMENTS

| | | |
|---|---|---|
| JP | S53-008530 A | 1/1978 |
| JP | H10-041951 A | 2/1998 |
| JP | 2001242494 A | 9/2001 |

(Continued)

*Primary Examiner* — Dalzid E Singh
(74) *Attorney, Agent, or Firm* — Harness, Dickey & Pierce, P.L.C.

(57) ABSTRACT

An optical buffer unit includes a plurality of delay line units each of which gives a delay to optical signals, and a switch that receives an optical signal output from one of the delay line units, includes a first output for outputting the optical signal to a next one of the delay line units and a second output for outputting the optical signal to another apparatus, and outputs the optical signal from the first output or the second output.

3 Claims, 14 Drawing Sheets

(56) References Cited

FOREIGN PATENT DOCUMENTS

| JP | 2012242619 A | 12/2012 |
| JP | 2019-517185 A | 6/2019 |
| WO | WO-2017/181855 A1 | 10/2017 |

* cited by examiner

OPTICAL BUFFER UNIT, OPTICAL SIGNAL PROCESSING APPARATUS, OPTICAL LABEL SWITCH AND CONTROL METHOD

CROSS-REFERENCE TO RELATED APPLICATIONS

This application is a 371 U.S. National Phase of International Application No. PCT/JP2020/022849, filed on Jun. 10, 2020, which claims priority to International Application No. PCT/JP2020/009225 filed on Mar. 4, 2020. The entire disclosures of the above applications are incorporated herein by reference.

TECHNICAL FIELD

The present invention relates to an optical buffer unit, an optical signal processing apparatus, an optical label switch, and a control method.

BACKGROUND ART

The development of a technology regarding optical buffering using a fiber delay line (FDL) is in progress. Such a fiber delay line is mainly used for an optical label switching apparatus. Several schemes have been proposed for optical buffering using such a fiber delay line. A technology described in PTL 1 is a technology using a fixed-length FDL. With such a technology, a specific delay time can be achieved. A technology described in PTL 2 is a technology using a plurality of FDLs having different fixed lengths, a 1×n switch, and an n×1 switch. In such a technology, FDLs that achieve a plurality of different delay times are installed, and the 1×n switch is controlled, making it possible to select an appropriate delay time. A technology described in PTL 3 is a technology using a fixed-length FDL and a 2×2 switch. In such a technology, an optical packet passes through the FDL multiple times according to control of the switch. By controlling this number of times, it is possible to give an optimum delay time.

In particular, in PTL 2 and PTL 3, it is possible to give a plurality of delay times to an optical packet. Such a variable-length delay time may be required to be given. For example, when an optical label processing time differs depending on each label, it is necessary to give a variable-length delay time to an optical payload in an optical packet according to the optical label processing time.

CITATION LIST

Patent Literature

[PTL 1] U.S. Pat. No. 6,545,781
[PTL 2] JP Hei 10-041951 A
[PTL 3] JP Sho 53-008530 A

SUMMARY OF THE INVENTION

Technical Problem

However, there is a problem in a technology of the related art for giving a variable-length delay time. For example, in the technology disclosed in PTL 2, because it is necessary to install an FDL for each length of the delay time, the required number of delay lines increases. Further, in the technology disclosed in PTL 3, the number of optical signals that can be buffered by one buffer is limited to one. Thus, it is difficult to improve processing efficiency.

In view of the above circumstances, an object of the present invention is to provide a technology capable of improving processing efficiency while curbing an increase in the number of delay lines.

Means for Solving the Problem

One aspect of the present invention is an optical buffer unit including: a plurality of delay line units, each delay line unit giving a delay to an optical signal; and a switch that receives an optical signal output from one of the plurality of delay line units, the switch including a first output for outputting the optical signal to a next one of the plurality of delay line units and a second output for outputting the optical signal to another apparatus, and outputting the optical signal from the first output or the second output.

One aspect of the present invention is an optical signal processing apparatus including: the optical buffer unit; and a processor that determines a time of a delay given to an optical signal input to the optical buffer unit, determines a switch outputting the optical signal via the second output from among a plurality of the switches of the optical buffer unit according to the determined time, and outputs a control signal to the determined switch.

One aspect of the present invention is an optical label switch including: the optical buffer unit; a separation unit that separates an input optical signal into an optical signal of a label and an optical signal of a payload; an optical switch including a plurality of output ports, the switch outputting an output signal including the optical signal of the payload from any one of the plurality of output ports; and an optical label processor that determines one of the plurality output ports for outputting the output signal based on the optical signal of the label, controls the optical switch such that the output signal is output from the determined output port, and updates and outputs a content of the label, wherein the optical label processor acquires a label processing time indicating a time for processing, determines a switch outputting the optical signal via the second output from among a plurality of the switches of the optical buffer unit according to the label processing time, and outputs a control signal to the determined switch.

One aspect of the present invention is a control method in an optical buffer unit including a plurality of delay line units and a switch, each delay line unit giving a delay to an optical signal, the switch receiving an optical signal output from the delay line unit, including a first output for outputting the optical signal to a next one of the plurality of delay line units and a second output for outputting the optical signal to another apparatus, and outputting the optical signal from the first output or the second output, the control method including: by each delay line unit, giving a delay to the optical signal, and by the switch, outputting the optical signal from the first output or the second output.

One aspect of the present invention is a control method including: by an optical signal processing apparatus including the optical buffer unit, determining a time of a delay given to an optical signal input to the optical buffer unit; by the optical signal processing apparatus, determining a switch outputting the optical signal via the second output from among a plurality of the switches of the optical buffer unit according to the determined time; by the optical signal processing apparatus, outputting a control signal to the determined switch; and by the optical buffer unit, outputting the optical signal in accordance with the control signal.

One aspect of the present invention is a control method performed by an optical label switch including an optical label switch including the optical buffer unit, and an optical switch including a plurality of output ports, the switch outputting an output signal including an optical signal of a payload from any one of the output ports, the control method including: by the optical label switch, separating the input optical signal into an optical signal of a label and an optical signal of a payload; by the optical label switch, determining one of the plurality of output ports for outputting the output signal based on the optical signal of the label; by the optical label switch, updating and outputting a content of the label; by the optical label switch, controlling the optical switch such that the output signal is output from the determined output port; and by the optical label switch, acquiring a label processing time indicating a time for processing, determining a switch outputting the optical signal via the second output from among a plurality of the switches of the optical buffer unit according to the label processing time, and outputting a control signal to the determined switch.

Effects of the Invention

According to the present invention, it is possible to improve processing efficiency while curbing an increase in the number of delay lines.

DESCRIPTION OF EMBODIMENTS

Embodiments of an optical switch of the present invention will be described in detail with reference to the drawings.

Overview

Figure 1:
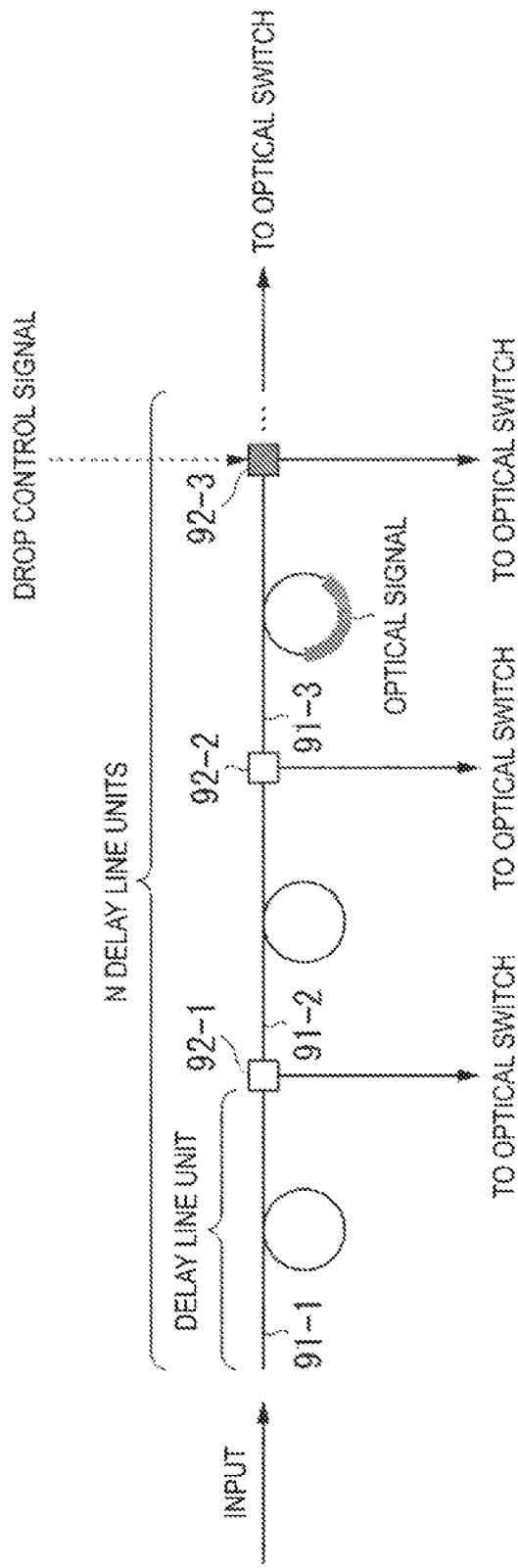
FIG. 1 is a diagram illustrating an overview of a configuration of an optical buffer used in an optical switch of the present invention.

FIG. 1 is a diagram illustrating an overview of a configuration of an optical buffer used in the optical switch of the present invention. The optical buffer includes N delay line units (delay line) 91. N is an integer greater than or equal to one. One delay line unit 91 gives a delay of a predetermined time (time T in the present embodiment) to an optical signal. The N delay line units 91 are connected in series. The delay line unit 91 and another delay line unit 91 are connected via one switch 92. The switch 92 is configured by using, for example, a 1-input 2-output switch. Each switch 92 receives a drop control signal from another apparatus. Each switch 92 has one of two states in accordance with the drop control signal.

Figure 2:
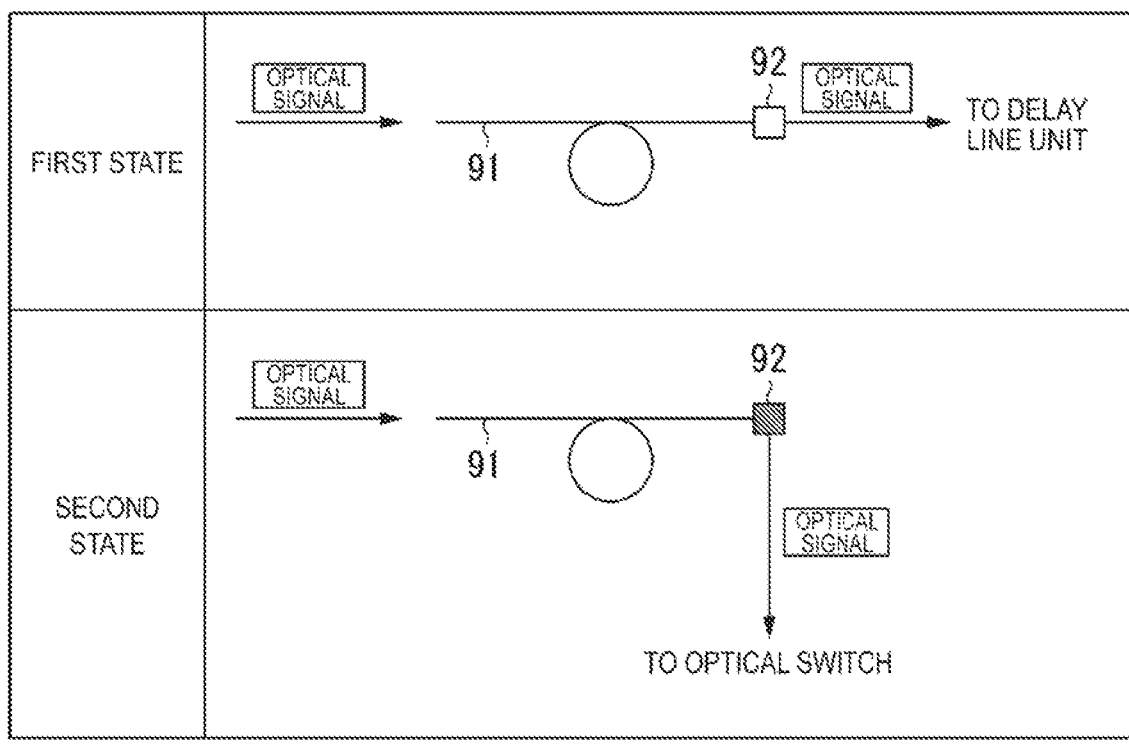
FIG. 2 is a diagram illustrating a specific example of two states of a switch 92.

FIG. 2 is a diagram illustrating a specific example of the two states of the switch 92. In a first state, the switch 92 outputs an input optical signal to the next delay line unit 91. In other words, when the switch 92 is in the first state, a delay is continuously given to the input optical signal. On the other hand, in a second state, the switch 92 outputs the input optical signal to the optical switch. In other words, when the switch 92 is in the second state, no further delay is given to the input optical signal. In this case, the optical signal is output from the optical buffer to the optical switch.

With such a configuration, from which switch 92 the optical signal is output to the optical switch is controlled, using the drop control signal, thereby giving a variable delay to each input signal. For example, it is possible to set the switch 92-1 into the second state and perform control of setting the remaining switches 92 (92-2, 92-3, . . . , 92-N) into the first state, thereby giving a delay (time T) to the input signal in one delay line unit 91-1. For example, it is possible to set the switch 92-2 into the second state and perform control of setting the remaining switches 92 (92-1, 92-3, . . . , 92-N) into the first state, thereby giving a delay (time T×2) to the input signal in the two delay line units 91-1 and 91-2. For example, it is possible to set the switch 92-n into the second state and perform control of setting the remaining switches 92 into the first state, thereby giving a delay (time T×n) to the input signal in the n delay line units 91.

Further, compared with PTL 1 described above, such a configuration has an effect of giving a variable optimal delay to the optical signal. Compared with PTL 2 described above, such a configuration has an effect of reducing a total number of required delay lines. Compared with PTL 3 described above, such a configuration has an effect of holding a plurality of optical signals in an optical buffer.

Figure 3:
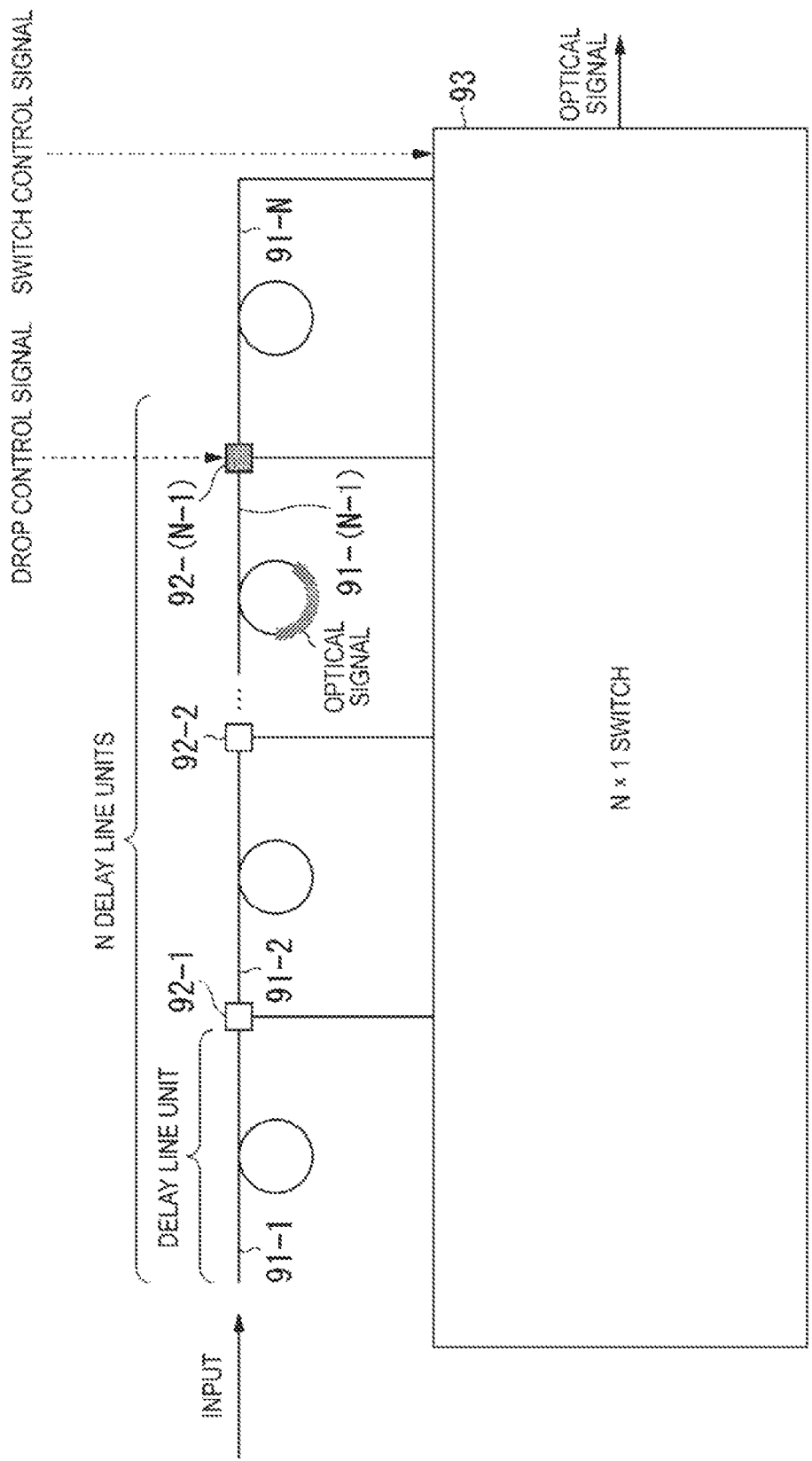
FIG. 3 is a diagram illustrating a specific example of the configuration of the optical buffer used in the optical switch of the present invention.

FIG. 3 is a diagram illustrating a specific example of a configuration of the optical buffer used in the optical switch of the present invention. The optical buffer illustrated in FIG. 3 includes an N×1 switch 93 as a specific example of a configuration in which an optical signal output from each switch 92 is output to the optical switch. The (N−1) number of switches 92 are connected to the N×1 switch 93. Further, output of the N-th delay line unit 91 (91-N) is connected to the N×1 switch 93. Thus, the output of each delay line unit 91 is connected to the N×1 switch 93. A switch control signal is input to the N×1 switch 93. The N×1 switch 93 connects one of the N inputs to an output in accordance with the switch control signal. The input connected to the output is an input connected to the switch 92 that outputs the optical signal to the N×1 switch 93 in accordance with the drop control signal. For example, in the example of FIG. 3, an input corresponding to the switch 92-(N−1) is output from the N×1 switch 93.

Details

Next, embodiments of the optical label switch of the present invention will be described. The optical label switch receives a signal configured as an optical signal, determines an appropriate port based on a label (optical label) included in the optical signal, and outputs the signal configured as an optical signal from the appropriate port. In the following description, a signal input to the optical label switch is referred to as an input signal, and a signal output from the optical label switch is referred to as an output signal.

Figure 4:
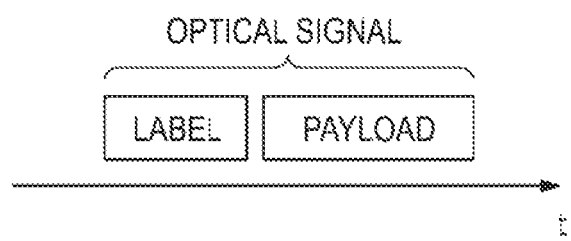
FIG. 4 is a diagram illustrating an overview of an optical signal that is input or output in an optical label switch.

FIG. 4 is a diagram illustrating an overview of an optical signal that is input or output in the optical label switch. The input signal and the output signal have a payload and a label. The payload is an actual part of data included in the optical signal. The label is a header portion of the data included in the optical signal, and includes information indicating, for example, a destination of the optical signal. The payload and the label may be arranged along a time axis, for example. In the example of FIG. 4, a label is arranged first on the time axis, and the payload is arranged after the label. Thus, the label is first input to the optical label switch, and then the payload is input to the optical label switch. The optical label switch updates the label included in the input signal and includes the updated label in the output signal. Thus, when the label is changed by updating, the label included in the input signal differs from the label included in the output signal. However, the label included in the input signal may be the same as the label included in the output signal.

Figure 5:
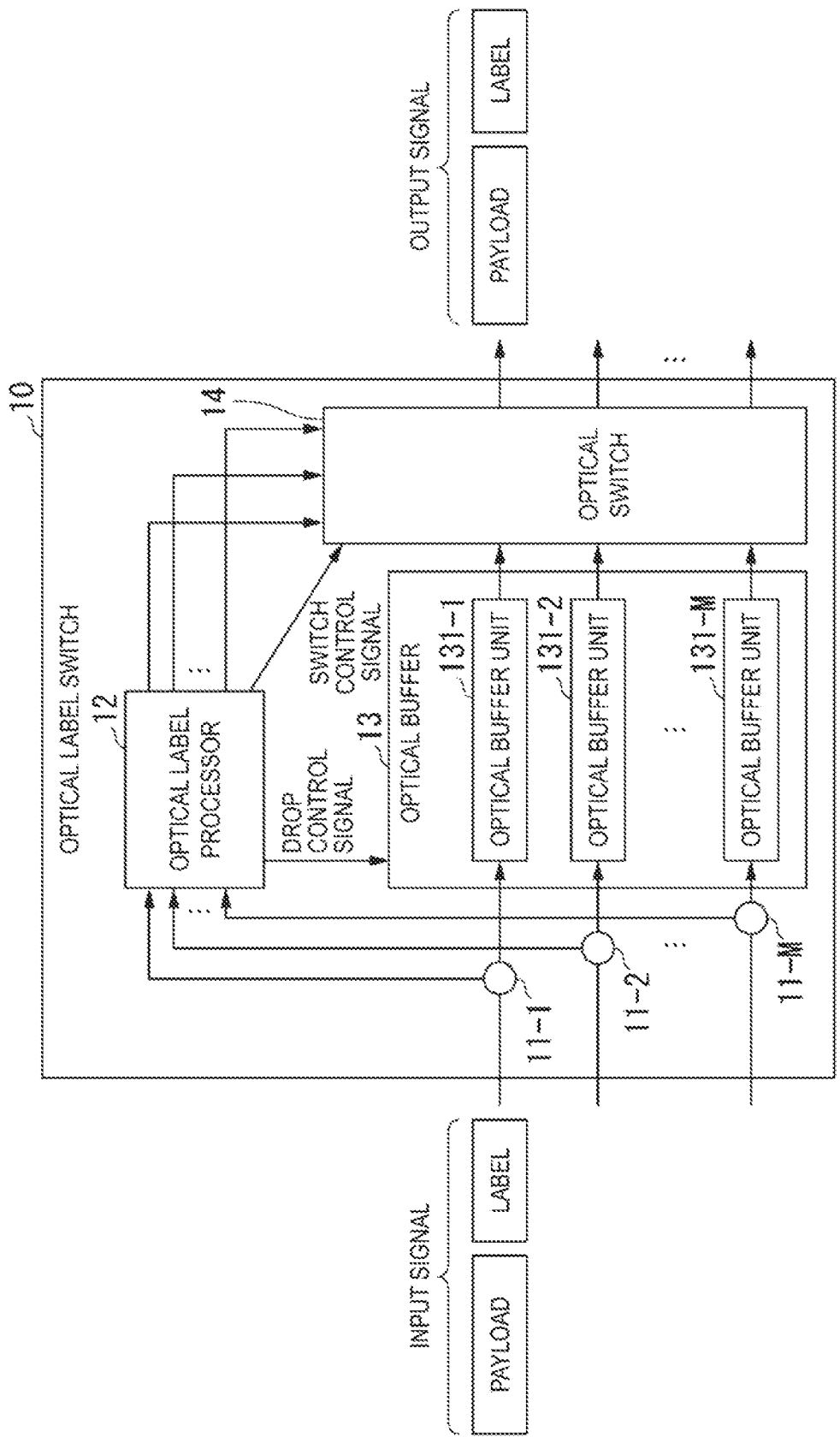
FIG. 5 is a schematic block diagram illustrating an overview of a functional configuration of an optical label switch 10 corresponding to the optical switch of the present invention.

FIG. 5 is a schematic block diagram illustrating an overview of a functional configuration of an optical label switch 10 corresponding to the optical switch of the present invention. The optical label switch 10 is provided with M signal systems as signal systems for input signals. That is, the optical label switch 10 is provided with M input ports. The optical label switch 10 includes a plurality of separation units (separators) 11, an optical label processor 12, an optical buffer 13, and an optical switch 14.

The number of the separation units 11 may be the same as the number (for example, M) of the input ports provided in the optical label switch 10. The separation unit 11 separates a label and a payload from the input optical signal. This separation may be achieved, for example, in accordance with different wavelengths being used for the label and the payload. The separation unit 11 may be configured by using, for example, filters for extracting the label and the payload. The label separated from the payload by the separation unit 11 is input to the optical label processor 12. The payload separated from the label by the separation unit 11 is input to the optical buffer 13.

The optical label processor 12 photoelectrically converts the label. The optical label processor 12 analyzes the obtained electric signal of the label and determines an output port of the optical signal corresponding to the label. The optical label processor 12 controls the optical switch 14 so that the optical signal is output from the determined output port. Such control may be performed, for example, by outputting a switch control signal indicating the output port to the optical switch 14. The optical label processor 12 acquires a period of time taken to process the label (hereinafter referred to as a "label processing time"), and controls the optical buffer 13 according to the label processing time. Specifically, the optical label processor 12 determines the switch 92 to be controlled to be set into the second state according to the label processing time, and outputs a drop control signal indicating control of setting into the second state to the determined switch 92.

The number of the optical buffers 13 may be the same as the number (for example, M) of the input ports provided in the optical label switch 10. Each optical buffer unit (optical buffer device) 131 has a configuration illustrated in FIG. 1. That is, the optical buffer unit 131 includes a plurality of delay line units 91 and a plurality of switches 92. The optical buffer unit 131 causes each switch 92 to transition to the first state or the second state based on the drop control signal output from the optical label processor 12. The payload to which the delay is given by the optical buffer unit 131 is output to the optical switch.

The optical switch 14 causes the label updated by the optical label processor 12 and the payload output from the optical buffer 13 to be substantially continuous on the time axis to generate the output signal. The output signal includes the payload and the label input from the same input system. Further, the expression "substantially continuous on the time axis" means that the label and the payload are arranged along the time axis, as illustrated in FIG. 4. The optical switch 14 outputs the output signal that has been thus generated, from the output port corresponding to the switch control signal. The optical switch 14 may be configured by using, for example, an optical wavelength switch. Although the optical switch 14 is drawn as a switch with M inputs and M outputs in the example of FIG. 5, the optical switch 14 may be configured as a switch in which the number of inputs differs from the number of outputs.

First Embodiment

Figure 6:
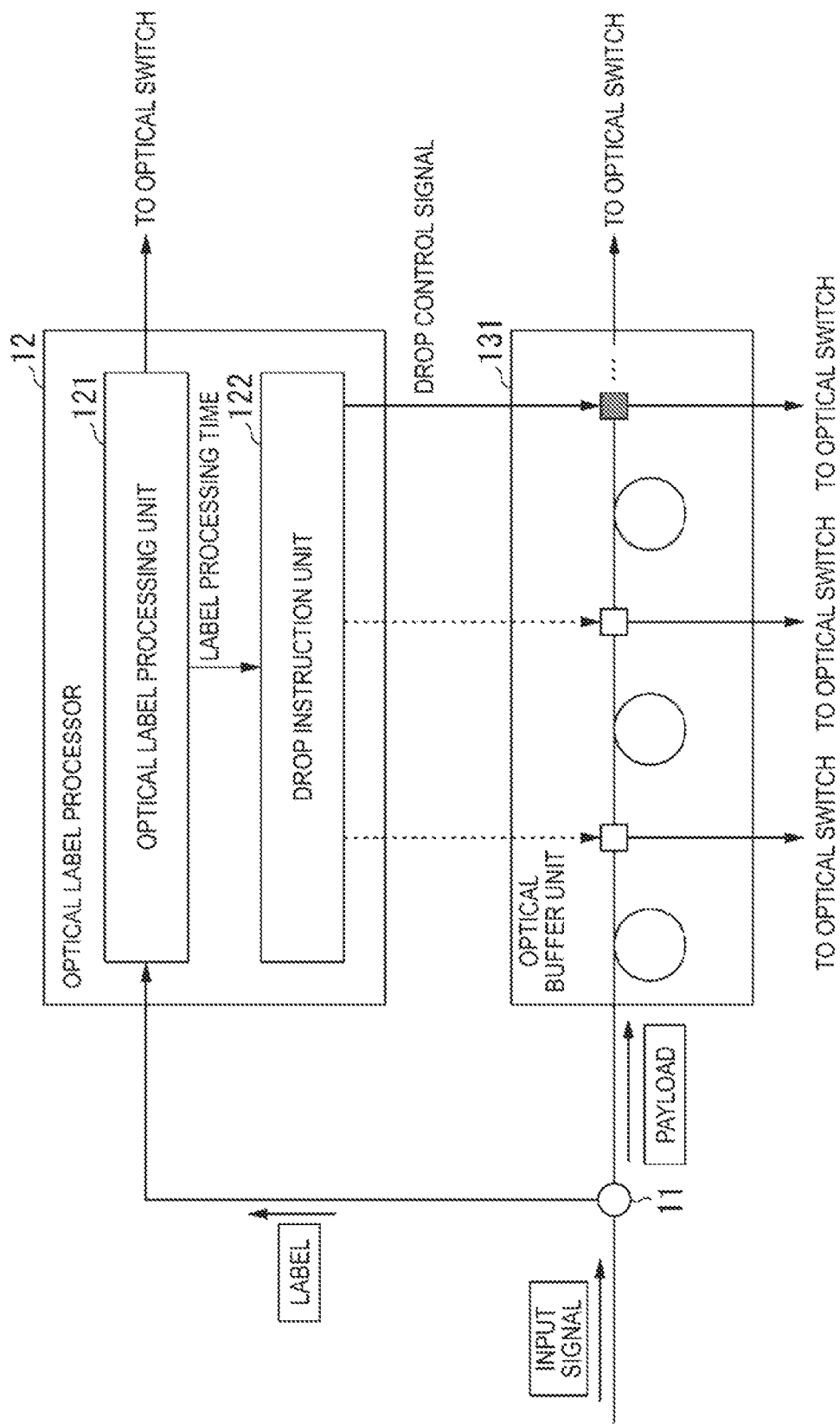
FIG. 6 is a diagram illustrating an overview of a first embodiment which is a specific example of the configuration of the optical label switch 10.

FIG. 6 is a diagram illustrating an overview of a first embodiment which is a specific example of the configuration of the optical label switch 10. FIG. 6 illustrates a configuration of one system. In the first embodiment, the optical label processor 12 includes an optical label processing unit 121 and a drop instruction unit 122.

The optical label processing unit 121 executes the following three processing operations. Processing of converting a label into an electric signal, determining an output port, and outputting a switch control signal to the optical switch 14. Processing of rewriting (updating) a label, converting the updated label into an optical signal, and outputting the updated label to the optical switch 14. Processing of acquiring a label processing time and outputting the label processing time to the drop instruction unit 122. Among the three processing operations, in particular, the third processing will be described. In addition, processing of updating and outputting the label may or may not be implemented in the optical label processing unit 121.

The optical label processing unit 121 may acquire the label processing time based on a clock time when an optical signal indicating a label is input to the optical label processing unit 121 (hereinafter referred to as an "input clock time") and a clock time when the optical label processing unit 121 ends processing for the label (hereinafter referred to as an "end clock time"). For example, a time indicating a difference between the end clock time and the input clock time may be acquired as the label processing time.

The optical label processing unit 121 may acquire the label processing time by using a multi-cycle scheme. In this case, the optical label processing unit 121 can acquire the label processing time based on the number of cycles. The multi-cycle scheme is disclosed in the following reference, for example.

Reference: "Realization scheme using multi-cycle" http://ocw.kyushu-u.ac.jp/menu/faculty/09/4/16.pdf The optical label processing unit 121 notifies the drop instruction unit 122 of the label processing time, for example, after the optical label processing unit 121 ends the processing for the label.

The drop instruction unit 122 determines a position of the optical signal of the payload in the optical buffer unit 131 based on the label processing time notified of from the optical label processing unit 121. The drop instruction unit 122 determines the switch 92 to be set into the second state according to the position of the optical signal of the payload. For example, the drop instruction unit 122 may determine that the switch 92 located immediately after the delay line unit 91 in which the optical signal of the payload is located is the switch 92 to be set into the second state. For example, when the optical signal of the payload is at the position of the switch 92, the drop instruction unit 122 may determine that this switch 92 is to be set into the second state.

More specifically, such processing may be achieved by the following processing. For example, the drop instruction unit 122 may acquire a smallest integer among values equal to or larger than a value obtained by dividing the label processing time by a unit delay time, as a value n indicating the position of the switch 92. In this case, the switches 92 connected in series are assigned values indicating positions in order from 1, as illustrated in FIG. 1. In FIG. 1, a number after a hyphen "-" in a reference sign assigned to each switch 92 is a value indicating the position. The drop instruction unit 122 outputs a drop control signal indicating control of setting into the second state to the determined switch 92.

Figure 7:
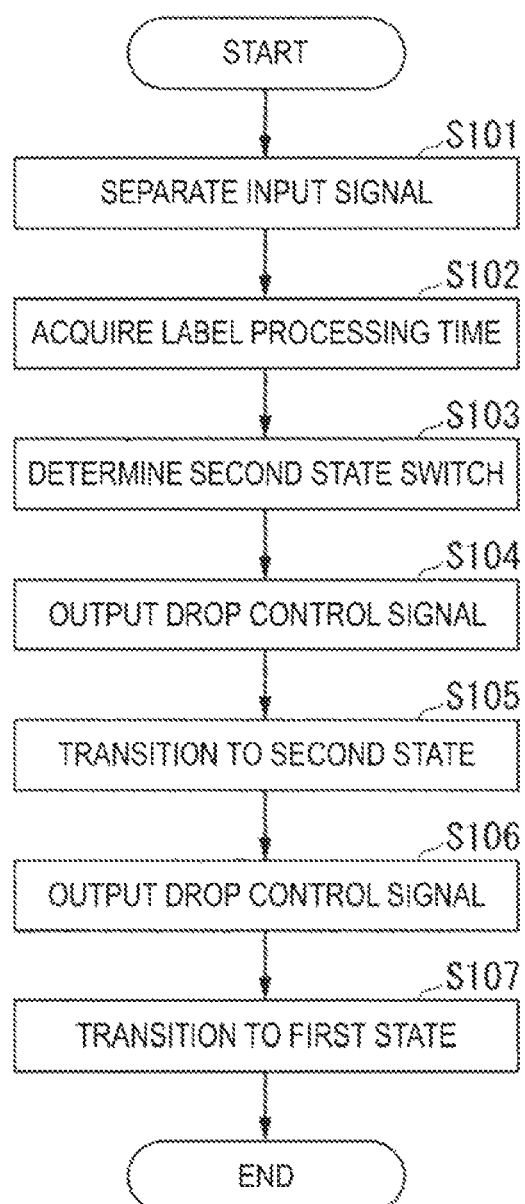
FIG. 7 is a flowchart illustrating processing regarding giving of a delay to an optical signal in the first embodiment.

FIG. 7 is a flowchart illustrating processing regarding giving of a delay to the optical signal in the first embodiment. First, the separation unit 11 separates the input signal into the label and the payload (step S101). The optical signal of the label is input to the optical label processor 12, and the optical signal of the payload is input to the optical buffer 13.

The optical label processing unit 121 converts the optical signal of the label into an electric signal, determines an output port, and outputs a switch control signal to the optical switch 14. The optical label processing unit 121 rewrites (updates) the label and converts the updated label into the optical signal. The label does not need to be rewritten (updated). In this case, the input label is directly converted into the optical signal. The optical label processing unit 121 outputs the optical signal of the updated label to the optical switch 14. The optical label processing unit 121 acquires the label processing time (step S102). The optical label processing unit 121 outputs the acquired label processing time to the drop instruction unit 122.

The drop instruction unit 122 determines a switch to be controlled to be set into the second state (a second state switch) based on the label processing time (step S103). The drop instruction unit 122 outputs a drop control signal indicating a transition to the second state to the determined second state switch (step S104).

The second state switch of the optical buffer unit 131 transitions to the second state in accordance with the drop control signal (step S105). The optical signal of the payload is output to the optical switch 14 by the switch 92 that has transitioned to the second state. Thereafter, the drop instruction unit 122 outputs a drop control signal indicating a transition to the first state to the second state switch (step S106). The second state switch of the optical buffer unit 131 transitions to the first state in accordance with the drop control signal (step S107). By repeatedly executing such processing, an appropriate delay time is given to the optical signal of the payload.

Figure 8:
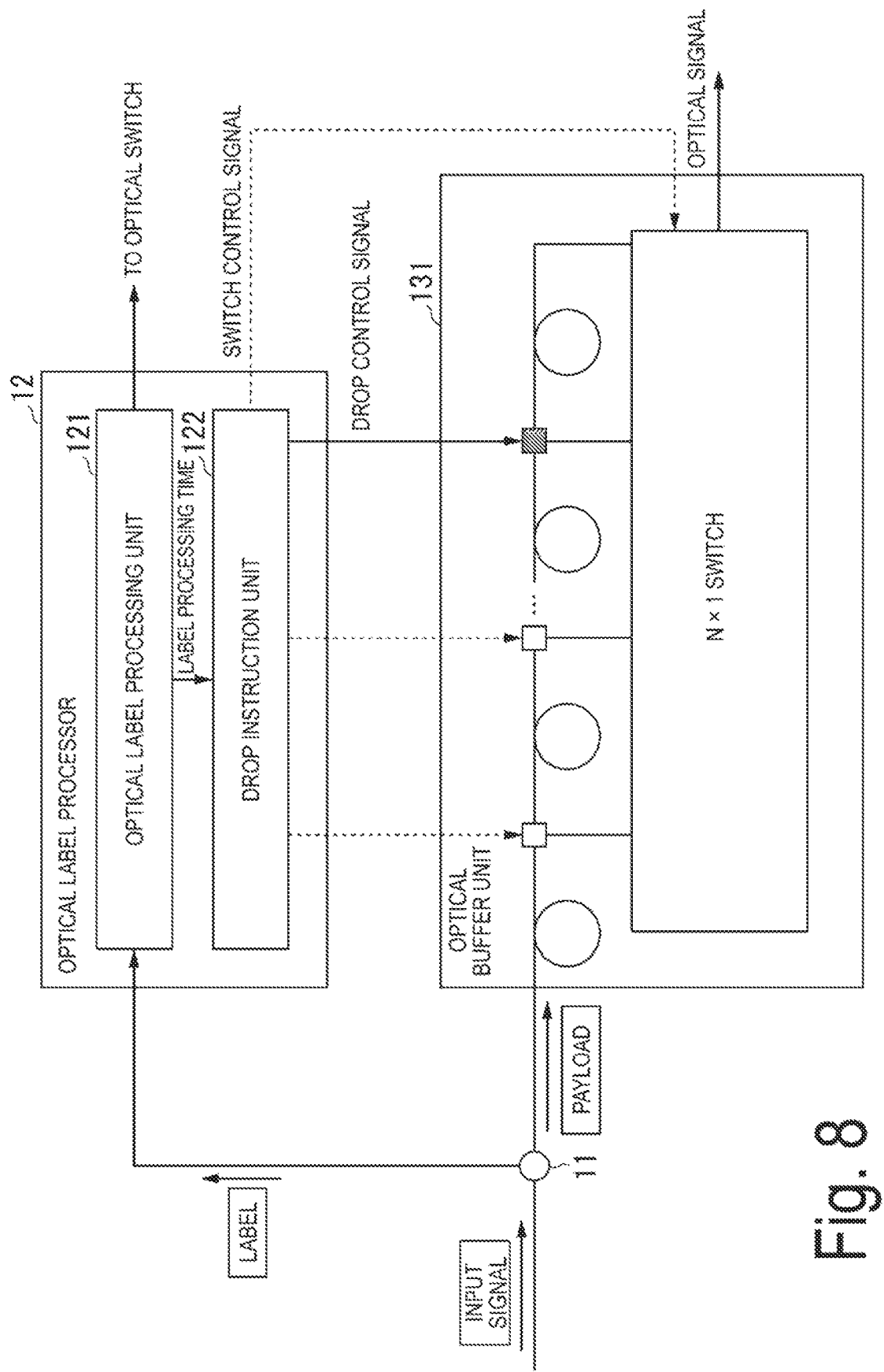
FIG. 8 is a diagram illustrating a specific example of the first embodiment of the optical label switch 10.

FIG. 8 is a diagram illustrating a specific example of the first embodiment of the optical label switch 10. FIG. 8 illustrates a configuration example in which the optical buffer unit 131 includes the N×1 switch 93. The drop instruction unit 122 outputs a switch control signal to the N×1 switch 93. Specifically, the drop instruction unit 122 outputs the switch control signal to the N×1 switch 93 so that the N×1 switch 93 outputs an input optical signal corresponding to the switch 92 to which the drop control signal is output. The N×1 switch 93 connects one of the N inputs to the output in accordance with the switch control signal. The input connected to the output is an input for receiving an optical signal from the switch 92 in accordance with the drop control signal. With this configuration, an optical signal with an appropriate delay time is output to the optical switch 14.

Second Embodiment

Figure 9:
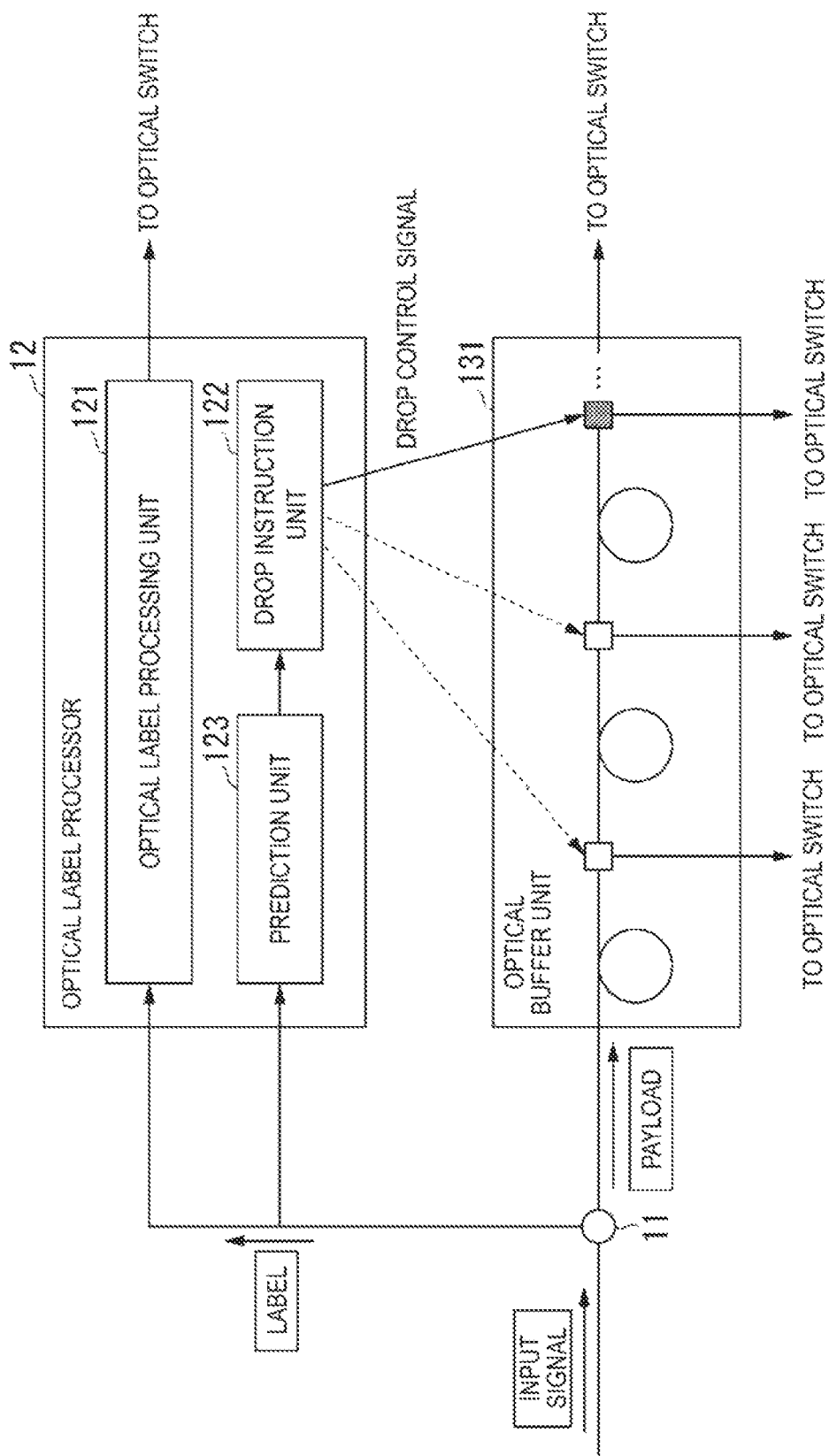
FIG. 9 is a diagram illustrating an overview of a second embodiment which is a specific example of the configuration of the optical label switch 10.

FIG. 9 is a diagram illustrating an overview of a second embodiment which is a specific example of the configuration of the optical label switch 10. FIG. 9 illustrates a configuration of one system. In the second embodiment, the optical label processor 12 includes an optical label processing unit 121, a drop instruction unit 122, and a prediction unit 123. The optical label processor 12 in the first embodiment specifies the delay line unit 91 in which the optical signal of the payload exists, based on the delay time T given by each delay line unit 91. In the optical label processor 12 of the second embodiment, the prediction unit predicts the label processing time based on, for example, physical information such as a signal length of the optical signal of the label. The drop instruction unit 122 determines the switch 92 to be set into the second state and outputs the drop control signal without receiving the notification of the end time or the label processing time from the optical label processing unit 121. In such a configuration, it is also possible to output a drop control signal before the processing in the optical label processing unit 121 ends. In the second embodiment, information used for prediction of the label processing time is not necessarily limited to the signal length of the optical signal of the label.

Figure 10:
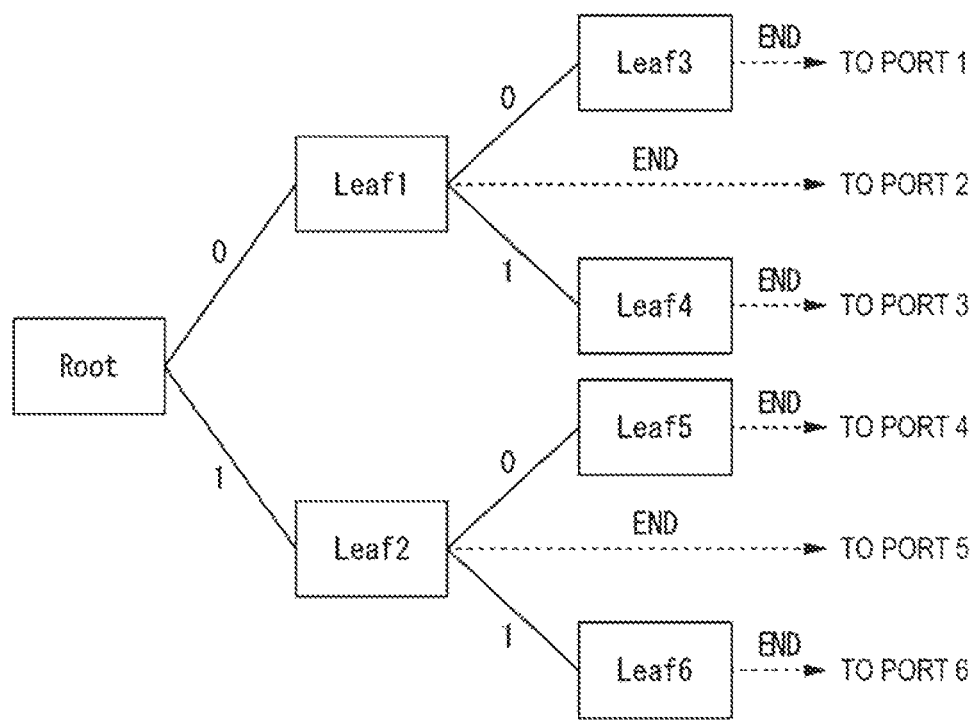
FIG. 10 illustrates an example of a binary tree that an optical label processing unit 121 uses when determining an output port.

A specific example of processing of the prediction unit 123 will be described. FIG. 10 illustrates an example of a binary tree that the optical label processing unit 121 uses when determining an output port. For example, the label indicates each output port as a string of "0" and "1". In this case, a binary tree as illustrated in FIG. 10 can be constructed. Each Leaf of this binary tree corresponds to an output port. For example, when a value of the label is "0", it reaches Leaf1 along a link of "0" from Root, and a branch ends there. Thus, in this case, a determination is made that the output port is port 2. For example, when the value of the label is "10", it reaches Leaf2 along a link of "1" from Root, and reaches Leaf5 along a link of "0", and then a branch ends there. Thus, in this case, a determination is made that the output port is port 4.

When a fixed time T1 is taken per bit to make such a determination of "0" or "1" at a branch, it is possible to predict the label processing time through multiplication of the fixed time T1 and a bit length of the label. For example, when the bit length of the label is L1, a value obtained by L1×T1 is the label processing time.

Figure 11:
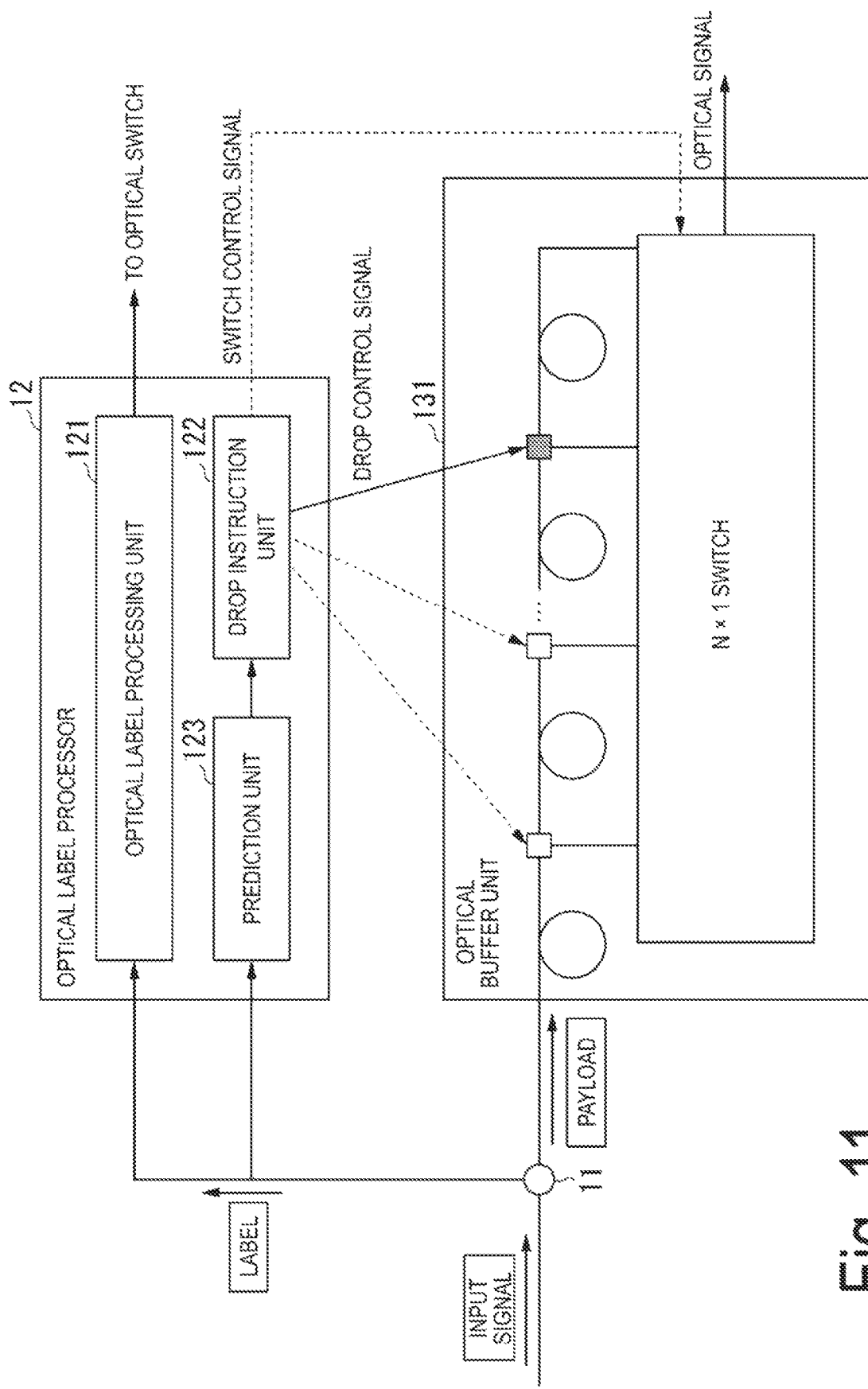
FIG. 11 is a diagram illustrating a specific example of the second embodiment of the optical label switch 10.

FIG. 11 is a diagram illustrating a specific example of a second embodiment of the optical label switch 10. FIG. 11 illustrates a configuration example in which the optical buffer unit 131 includes the N×1 switch 93. The drop instruction unit 122 outputs a switch control signal to the N×1 switch 93. Specifically, the drop instruction unit 122 outputs the switch control signal to the N×1 switch 93 so that the N×1 switch 93 outputs an input optical signal corresponding to the switch 92 to which the drop control signal is output. The N×1 switch 93 connects one of N inputs to the output in accordance with the switch control signal. The input connected to the output is an input for receiving an optical signal from the switch 92 in accordance with the drop control signal. With this configuration, an optical signal with an appropriate delay time is output to the optical switch 14.

In the optical label switch 10 configured as described above, the configuration as illustrated in FIG. 1 is adopted as a buffer that gives the delay time to the optical signal. That is, the optical buffer is configured by using a plurality of delay line units 91 connected in series and switches 92 provided between the delay line units 91. Thus, it is possible to improve processing efficiency while curbing an increase in the number of delay lines. More specifics are as follows.

In the optical buffer having the configuration illustrated in FIG. 1, it is not necessary to provide a delay line unit having a different length for each delay time. Thus, it is possible to achieve a variable-length optical buffer while curbing an increase in the number of delay lines. Further, in the optical buffer having the configuration as illustrated in FIG. 1, it is possible to simultaneously hold a plurality of optical signals in one optical buffer unit 131. That is, before one optical signal is output (dropped) to the optical switch 14 by the switch 92, the next optical signal can be input to and held in the same optical buffer unit 131. Thus, it is possible to improve processing efficiency.

Modification Example

In the above-described embodiment, the delay times given to the optical signal by the respective delay line units 91 are the same (time T). However, the delay times given to the optical signal by the respective delay line units 91 may differ.

In the specific example illustrated in FIG. 5, the optical buffer 13 includes a plurality of optical buffer units 131. However, the optical buffer 13 may be configured to include one optical buffer unit 131.

An embodiment may be configured as an optical signal processing apparatus including the optical buffer 13 and the drop instruction unit 122 described above. In this case, the drop instruction unit 122 determines the switch 92 to be set into the second state according to the delay time determined by another apparatus (for example, the optical label processing unit 121 or the prediction unit 123), and outputs the drop control signal. Such a configuration may be adopted in the first embodiment or may be adopted in the second embodiment.

When the optical label processing unit 121 and the drop instruction unit 122 are synchronized with each other, the drop instruction unit 122 may calculate the label processing time. With such a configuration, the optical signal of the label is input to the optical label processing unit 121 and the drop instruction unit 122 in parallel. The drop instruction unit 122 acquires a clock time when the optical signal of the label is input, as the input clock time. The optical label processing unit 121 outputs a clock time (end clock time) when the processing for the label ends to the drop instruction unit 122. The drop instruction unit 122 acquires the label processing time based on the input clock time and the end clock time.

The optical label processing unit 121 may notify the drop instruction unit 122 of the end of the processing at a timing when the processing for the label has ended instead of outputting the end time. In this case, the drop instruction unit 122 acquires the label processing time with a clock time when the notification is received as the end clock time.

Figure 12:
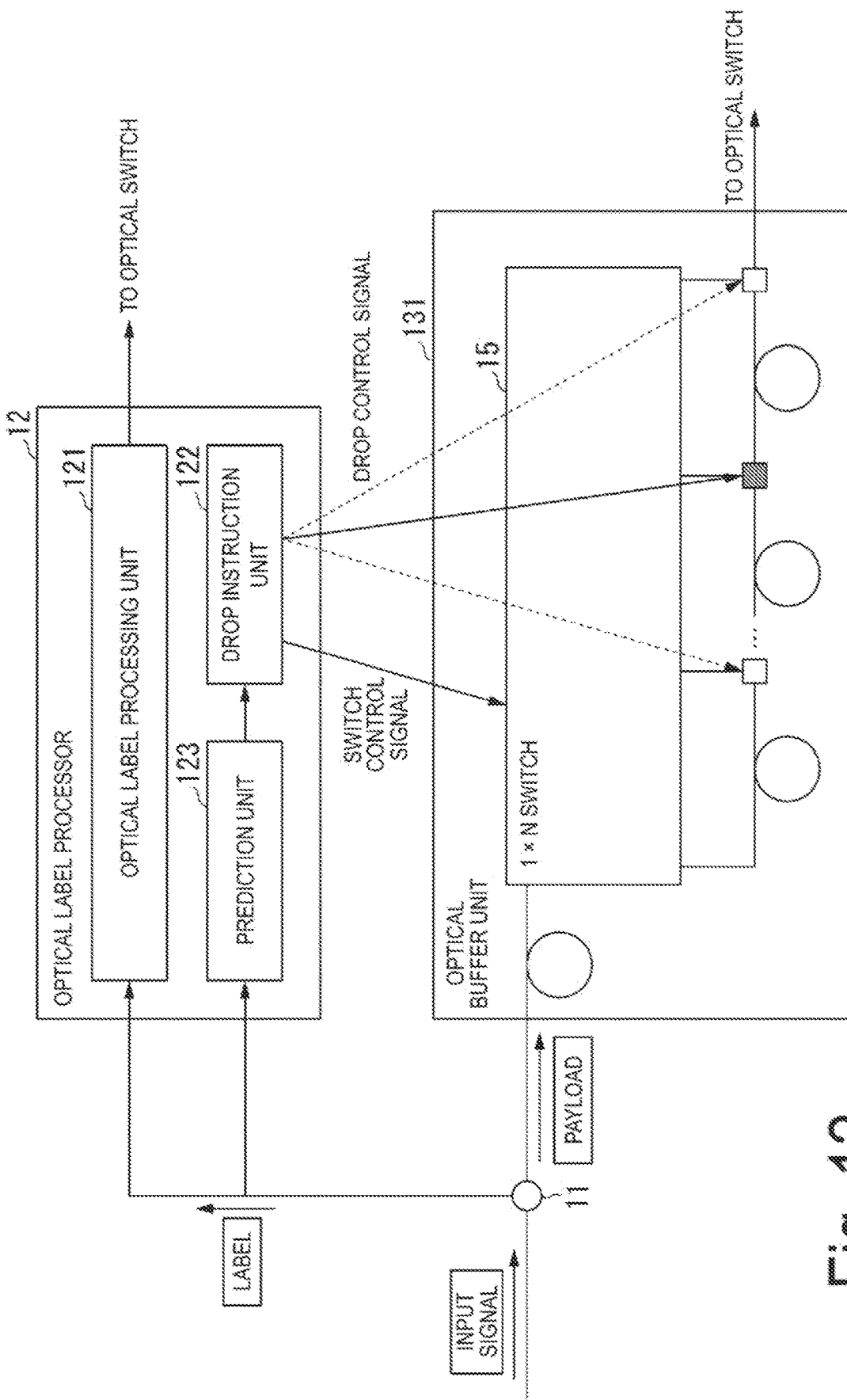
FIG. 12 is a diagram illustrating a first modification example of the optical buffer unit.

FIG. 12 is a diagram illustrating a first modification example of the optical buffer unit. The first modification example of the optical buffer unit as illustrated in FIG. 12 may be applied to the optical label processor 12 in the second embodiment.

The optical buffer unit illustrated in FIG. 12 includes a 1×N switch 15. The plurality of delay line units 91 and the switch 92 are provided on the output side of the 1×N switch 15. That is, N outputs of the 1×N switch 15 are connected to different switches 92. The payload of the input signal is input to the 1×N switch 15. The input payload is output to any one of the switches 92 in accordance with the switching in the 1×N switch 15. The switch control signal is input to the 1×N switch 15 from the drop instruction unit 122. The 1×N switch 15 performs switching in accordance with the switch control signal. That is, the 1×N switch 15 connects the input to one of the N outputs in accordance with the switch control signal.

The drop control signal is output from the drop instruction unit 122 to the switch 92 to which the payload is output. Thus, the payload output from the 1×N switch 15 to the switch 92 reaches the optical switch 14 via the delay line unit 91 located downstream of the switch 92 (on the optical switch side). Thus, an appropriate delay is given to the payload. When the payload is output to the most downstream switch 92, the payload may reach the optical switch 14 without passing through the delay line unit 91.

Figure 13:
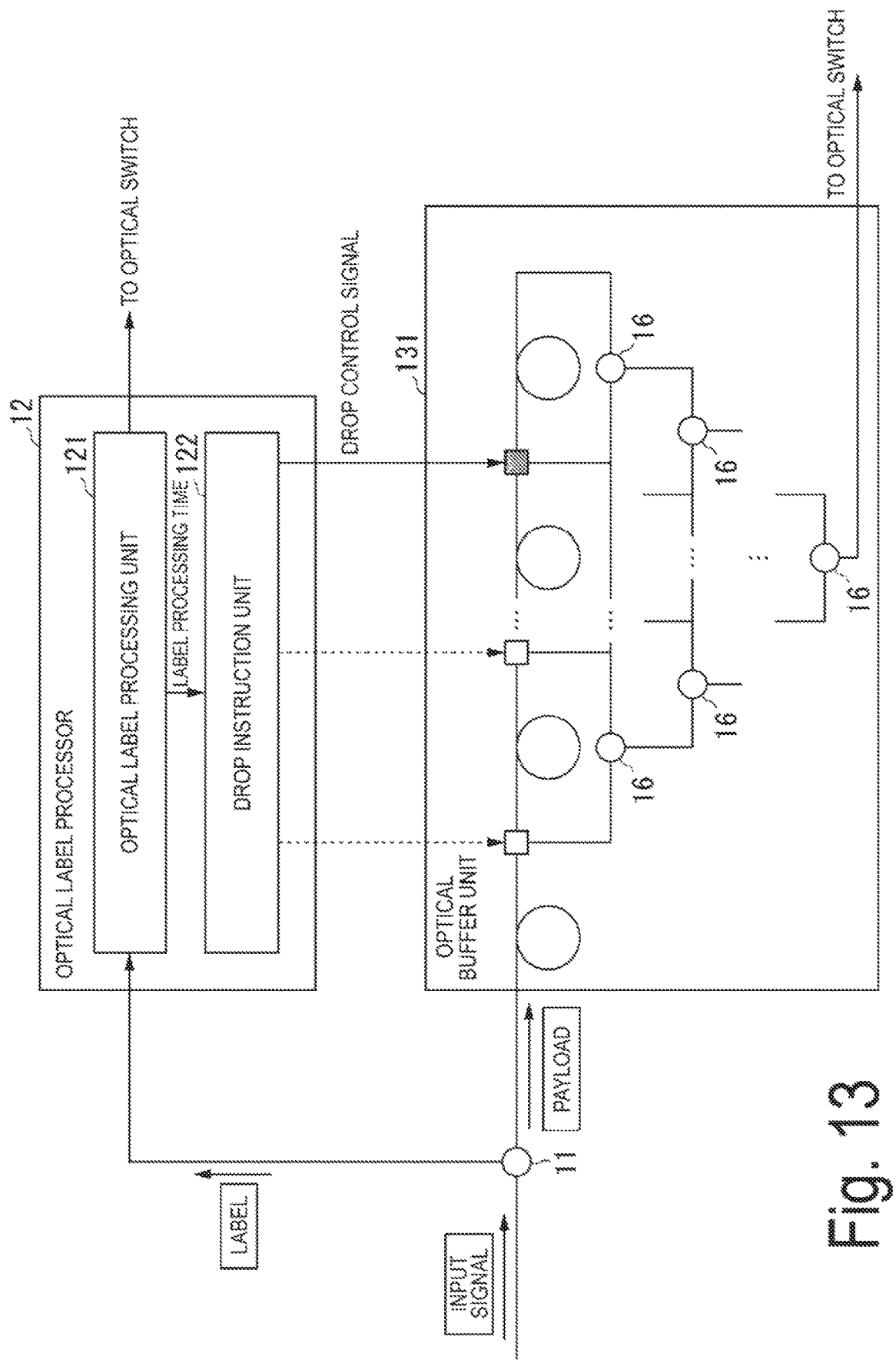
FIG. 13 is a diagram illustrating a second modification example of the optical buffer unit.
Figure 14:
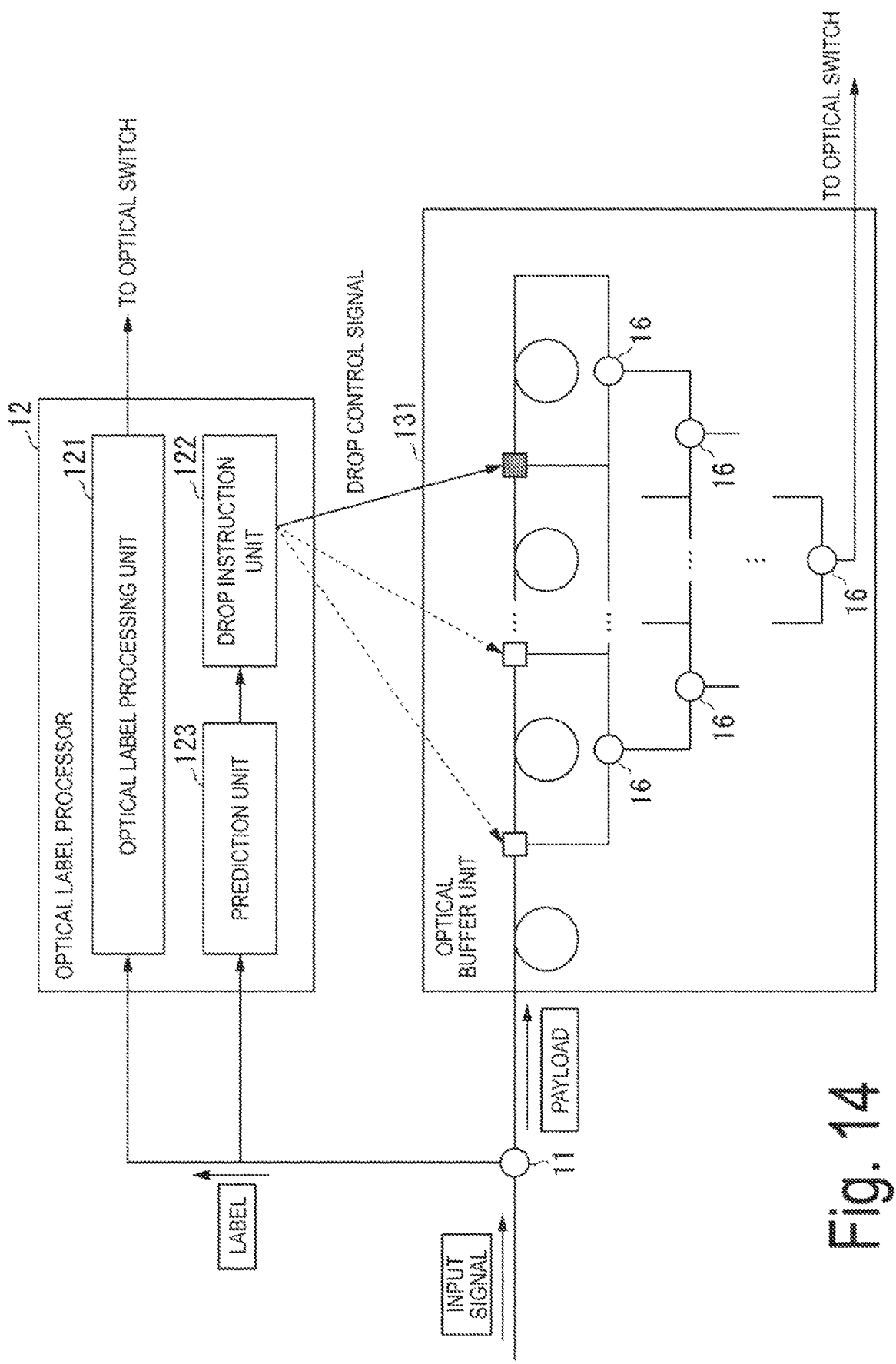
FIG. 14 is a diagram illustrating the second modification example of the optical buffer unit.

FIGS. 13 and 14 are diagrams illustrating a second modification example of the optical buffer unit. The second modification example of the optical buffer unit may be applied to the optical label processor 12 in the first embodiment, or may be applied to the optical label processor 12 in the second embodiment. FIG. 13 illustrates a configuration example applied to the first embodiment, and FIG. 14 illustrates a configuration example applied to the second embodiment.

First, a configuration in which the second modification example is applied to the first embodiment will be described with reference to FIG. 13. In an example of FIG. 13, the optical splitters 16 in a multi-stage configuration is connected to outputs of the switches 92 and an output of the delay line unit 91 at a final end. Each optical splitter 16 bundles (combines) two inputs received from an upper stage and outputs one signal to a lower stage. Because the optical splitters 16 are provided in a multi-stage configuration, outputs from all the switches 92 are finally bundled in the lowermost optical splitter 16. The lowermost optical splitter 16 outputs a signal to the optical switch 14. With such a configuration, the optical signal output from the switch 92 in accordance with the drop control signal is output to the optical switch 14 via the multi-stage optical splitters 16. Similarly, in the example of FIG. 14, the optical signal output from the switch 92 in accordance with the drop control signal is output to the optical switch 14 via the multi-stage optical splitters 16. With such a configuration, because a plurality of the optical splitters 16 are used instead of the N×1 switch or the 1×N switch, it is possible to curb costs. Further, it is possible to give a delay with a reduced number of control apparatuses and through simpler control.

Although the embodiments of the present invention have been described in detail with reference to the drawings, a specific configuration is not limited to the embodiments, and includes, for example, a design within a range that does not depart from the gist of the present invention.

INDUSTRIAL APPLICABILITY

The present invention is applicable to an apparatus that gives a variable-length delay time to an optical signal.

REFERENCE SIGNS LIST

10: Optical label switch
11: Separation unit
12: Optical label processor
121: Optical label processing unit
122: Drop instruction unit
123: Prediction unit
13: Optical buffer
131: Optical buffer unit
14: Optical switch
91: Delay line unit
92: Switch

The invention claimed is:

1. An optical label switch comprising:
an optical buffer device having
  a plurality of delay line, each delay line being configured to give a delay to an optical signal; and
  a switch configured to receive an optical signal output from one of the plurality of delay line, the switch including a first output configured to output the optical signal to a next one of the plurality of delay line and a second output configured to output the optical signal to another apparatus, the switch being configured to output the optical signal from the first output or the second output;
a seperator configured to separate an input optical signal into an optical signal of a label and an optical signal of a payload;
an optical switch including a plurality of output ports, the optical switch being configured to output an output signal including the optical signal of the payload from any one of the plurality of output ports; and
an optical label processor configured to determine one of the plurality of output ports for outputting the output signal based on the optical signal of the label and control the optical switch such that the output signal is output from the determined output port, wherein
the optical label processor acquires a label processing time indicating a time for processing, determines a switch outputting the optical signal via the second output from among a plurality of the switches of the optical buffer device according to the label processing time, and outputs a control signal to the determined switch.

2. A control method comprising:
by an optical signal processing apparatus, determining a time of a delay given to an optical signal input to an optical buffer device, where the optical buffer device includes
  a plurality of delay line, each delay line being configured to give a delay to an optical signal; and
  a switch configured to receive an optical signal output from one of the plurality of delay line, the switch including a first output configured to output the optical signal to a next one of the plurality of delay line and a second output configured to output the optical signal to another apparatus, the switch being configured to output the optical signal from the first output or the second output;
by the optical signal processing apparatus, determining a switch outputting the optical signal via the second output from among a plurality of the switches of the optical buffer device according to the determined time;
by the optical signal processing apparatus, outputting a control signal to the determined switch; and
by the optical buffer device, outputting the optical signal in accordance with the control signal.

3. A control method performed by an optical label switch including an optical buffer device, and an optical switch including a plurality of output ports, where the optical buffer device includes
  a plurality of delay line, each delay line being configured to give a delay to an optical signal; and
  a switch configured to receive an optical signal output from one of the plurality of delay line, the switch including a first output configured to output the optical signal to a next one of the plurality of delay line and a second output configured to output the optical signal to another apparatus, the switch being configured to output the optical signal from the first output or the second output; and
the optical switch being configured to output an output signal including an optical signal of a payload from any one of the plurality of output ports, the control method comprising:
by the optical label switch, separating the input optical signal into an optical signal of a label and an optical signal of a payload;
by the optical label switch, determining one of the plurality of output ports for outputting the output signal based on the optical signal of the label;
by the optical label switch, updating and outputting a content of the label;
by the optical label switch, controlling the optical switch such that the output signal is output from the determined output port; and
by the optical label switch, acquiring a label processing time indicating a time for processing, determining a switch outputting the optical signal via the second output from among a plurality of the switches of the optical buffer device according to the label processing time, and outputting a control signal to the determined switch.

* * * * *